United States Patent
Kitano et al.

(10) Patent No.: US 6,321,062 B1
(45) Date of Patent: Nov. 20, 2001

(54) FIXING-UNIT ROLLER MAKING USE OF COMPOSITE MATERIAL, PROCESS FOR ITS PRODUCTION, AND FIXING ASSEMBLY EMPLOYING THE ROLLER

(75) Inventors: Yuji Kitano, Yokohama; Kazuo Kishino, Kawasaki; Masaaki Takahashi, Asaka; Hideo Kawamoto, Tokyo; Osamu Soutome, Kawasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/520,160

(22) Filed: Mar. 7, 2000

(30) Foreign Application Priority Data

Mar. 9, 1999 (JP) .................................................. 11-061989

(51) Int. Cl.$^7$ .............................. G03G 15/20; B25F 5/02
(52) U.S. Cl. ........................ 399/333; 399/330; 399/331; 430/124; 492/56
(58) Field of Search ................................... 399/333, 330, 399/331; 430/124; 492/56

(56) References Cited

U.S. PATENT DOCUMENTS

| | | |
|---|---|---|
| 5,319,427 | 6/1994 | Sakurai et al. ........................ 355/285 |
| 5,420,679 | 5/1995 | Goto et al. ........................... 355/285 |
| 5,608,508 | 3/1997 | Kumagai et al. ..................... 399/339 |
| 5,717,988 | 2/1998 | Jinzai et al. .......................... 399/333 |
| 5,753,348 | 5/1998 | Hatakeyama et al. ............... 428/195 |
| 5,765,086 | 6/1998 | Kishino et al. ...................... 399/329 |
| 5,950,061 | 9/1999 | Ota et al. ............................. 399/333 |
| 5,966,578 | 10/1999 | Soutome et al. ..................... 399/333 |

FOREIGN PATENT DOCUMENTS

| | | |
|---|---|---|
| 0 619 533 | 10/1994 | (EP) . |
| 5-147126 | 6/1993 | (JP) . |
| 6-308848 | 11/1994 | (JP) . |
| 8-193166 | 7/1996 | (JP) . |
| 9-12893 | 1/1997 | (JP) . |
| 9-96981 | 4/1997 | (JP) . |

Primary Examiner—Mark Chapman
(74) Attorney, Agent, or Firm—Fitzpatrick, Cella, Harper & Scinto

(57) ABSTRACT

A fixing-unit roller has a fixing roller and/or a pressure roller in which a composite material of an organopolysiloxane and a fluoroelastomer containing no fluorine resin or containing a fluorine resin is used as an elastic material of at least the outermost layer. The composite material has an island-in-sea structure wherein the organopolysiloxane stands as a sea phase and the fluoroelastomer containing no fluorine resin or containing a fluorine resin stands as an island phase. The particles of the island phase have a size ranging from 1 $\mu$m to 10 $\mu$m. The fixing-unit roller has superior toner releasability and superior scratch resistance and wear resistance.

10 Claims, 3 Drawing Sheets

FIXING-UNIT ROLLER MAKING USE OF COMPOSITE MATERIAL, PROCESS FOR ITS PRODUCTION, AND FIXING ASSEMBLY EMPLOYING THE ROLLER

BACKGROUND OF THE INVENTION

1. Field of the Invention

This invention relates to a fixing-unit roller used in fixing units used in electrophotographic image-forming apparatus such as copying machines and LBPs (laser beam printers) and is required to have both toner releasability and scratch/wear resistance, and also relates to a process for its production and a fixing assembly employing such a fixing-unit roller.

2. Related Background Art

In electrophotographic apparatus, used as a pair of rollers with which toner images are fixed by heat and pressure, i.e., a fixing roller and a pressure roller, are those comprising a cylindrical mandrel and formed thereon an elastic material layer having a single-layer or multi-layer structure. As materials for forming the elastic material layer, organopolysiloxanes (silicone rubbers) and fluoroelastomers are used, which have good heat resistance, chemical resistance and weatherability.

Important properties required when these materials are used as elastic materials for the outermost layer in the fixing or pressure roller are chiefly exemplified by toner releasability and scratch/wear resistance.

The toner releasability is meant to be an unlikelihood for the toner to adhere to the roller surface when a toner image formed electrostatically is fixed by heat and pressure between fixing and pressing rollers. When the material used in the outermost layer of the roller has a poor toner releasability, the toner may adhere to the roller surface to cause toner offset, where blank areas appear in copied images. Also, even when a material having relatively so good a toner releasability as to cause no toner offset, the fixing of toner images repeatedly may make the toner releasability poor to cause the toner offset in some cases at a stage where copies have been taken on hundreds or thousands of sheets. Accordingly, in view of the performance of the roller, it is important to use in the outermost layer a material having a good toner releasability.

The scratch/wear resistance is meant to be an unlikelihood for the roller surface to become scratched as a result of the repeated fixing of toner images.

As a member set in contact with the fixing roller or pressure roller, in the case of the fixing roller for example, a web for applying silicone oil and for cleaning its surface to remove the offset toner is set in contact with it in some instances in order to prevent the toner offset from occurring. In such a case, as a result of the repeated fixing of toner images, the offset toner or paper dust may adhere to the part where the web is in contact, and such matter having adhered may cause scratch lines on the roller surface. Also, in the case of the pressure roller, for example, a blade for scraping off any excess silicone oil is set in pressure contact with the roller surface in some instances. In such a case, the offset toner or paper dust may likewise adhere to the part where the blade is in pressure contact, and such matter having adhered may cause scratch lines on the roller surface. Where the scratch lines have occurred on the roller surface, in the case of the fixing roller, the scratch lines may adversely affect copied images. In the case of the pressure roller, the offset toner may gathers at the part of scratch lines to cause contamination due to the toner adhering to the back of a recording material such as paper.

When a material having poor scratch resistance and wear resistance is used in the outermost layer, the roller surface tends to be scratched to cause the problems as stated above. Accordingly, it is also important to use in the outermost layer a material having good scratch resistance and wear resistance.

Materials' physical properties that determine the toner releasability or the scratch/wear resistance are chiefly exemplified by surface energy and hardness. It is thought that, the lower surface energy a material has, the better the toner releasability is. It is also thought that, the higher hardness a material has, the better the scratch/wear resistance is. Organopolysiloxanes, which are relatively low in both surface energy and hardness, are considered to be superior in toner releasability but inferior in scratch/wear resistance. On the other hand, fluoroelastomers are relatively high in both surface energy and hardness, and, contrary to the organopolysiloxanes, are considered to be superior in scratch/wear resistance but inferior in toner releasability.

In the past, for the purpose of improving the scratch/wear resistance of organopolysiloxanes, proposed are an organopolysiloxane incorporated with fused silica having an average particle diameter of 0.5 to 20 $\mu$m (Japanese Patent Application Laid-open No. 8-193166) and an organopolysiloxane incorporated with spherical tetrafluoroethylene resin particles (Japanese Patent Application Laid-open No. 9-12893). These conventional materials, however, are both organopolysiloxanes mixed with resin, and it follows that the properties of organopolysiloxanes as elastic materials are damaged to a certain extent. Hence, in order to obtain composite materials having good properties as elastic materials, it is considered effective to incorporate organopolysiloxanes not with resin but with an elastic material having good scratch/wear resistance. One of such materials may include fluoroelastomers.

Accordingly, in order to obtain materials having good physical properties inherent individually in organopolysiloxanes and fluoroelastomers, studies have hitherto been made on composite materials prepared by mixing the both. For example, proposed are a roller comprising an aluminum mandrel and provided around it an elastic material layer formed using a composite material composed of an organopolysiloxane and a fluoroelastomer which have been mixed mechanically or by dissolving or dispersing them in an organic solvent (Japanese Patent Application Laid-open No. 5-147126), those making use of a composite material having a fluoroelastomer as a matrix component and, dispersed in this fluoroelastomer matrix, particles comprised of at least one of a reactive silicone oil and a reactive fluorine oil (Japanese Patent Application Laid-open No. 9-96981), and a fixing member making use of a uniform-system composite material obtained by adding an amine coupler having a silane side group and a hydrolyzable silane compound such as tetraethoxysilane to cause a fluoroelastomer and an organopolysiloxane to combine chemically (Japanese Patent Application Laid-open No. 6-308848).

In the prior art disclosed in Japanese Patent Application Laid-open No. 5-147126, a method of mixing materials mechanically is proposed as a means for preparing the composite material. However, the state of dispersion that is attained by mixing materials mechanically is relatively rough, because organopolysiloxanes commonly have a low viscosity and fluoroelastomers a low Mooney viscosity and their difference in viscosity is too great for them to be dispersible with ease. Thus, an island phase comprised of a fluoroelastomer may have particle diameters of tens to hundreds of micrometers. Taking account concurrently of the fact that toners have particle diameters of several micrometers, it can be said that any satisfactory state of dispersion has not been attained. Also, in the same prior art disclosed in Japanese Patent Application Laid-open No 5-147126, as another means for preparing the composite material, it is proposed to dissolve or disperse materials in an organic solvent. However, composite materials obtained by mixing dissolving or dispersing materials in an organic solvent commonly have a great difference in polarity between the organopolysiloxane and the fluoroelastomer, where the both are poorly compatible with each other. Hence, depending on the rate of evaporation of the solvent, either of them may be present in the matrix in the form of large agglomerates of about tens to hundreds micrometers in size. Thus, their state of dispersion is likewise rough in some cases. Moreover, in full-color machines more required to have toner releasability than monochromatic machines, there is a problem that the roller surface has a little insufficient toner releasability because the island phase fluorine rubber has a high surface energy.

In the prior art disclosed in Japanese Patent Application Laid-open No. 9-96981, taking account of such problems, particles comprised of a reactive silicone oil or a reactive fluorine oil are made to partly react and fix in the fluoroelastomer matrix so that they are dispersible in a state of particle diameters of 30 μm or smaller. The composite material thus obtained is improved in the state of dispersion. However, the fluoroelastomer, one having a higher surface energy than the other, stands as a sea phase. Hence, compared with a composite material having a sea phase and an island phase in a fashion opposite to this prior art, i.e., a composite material in which the organopolysiloxane stands as a sea phase, the latter is considered advantageous from the viewpoint of toner releasability.

In the prior art disclosed in Japanese Patent Application Laid-open No. 6-308848, it is described that a uniform-system composite material comprised of a organopolysiloxane and a fluoroelastomer is obtainable in which they have been united at the level of polymer molecules. However, it does not disclose any form of composite material that is a dispersion system having a island-in-sea structure wherein the organopolysiloxane stands as a sea phase and the fluoroelastomer as an island phase.

SUMMARY OF THE INVENTION

An object of the present invention is to provide a fixing-unit roller having both a good toner releasability and a good scratch/wear resistance, in which a composite material obtained by dispersing a is fluoroelastomer uniformly in an organopolysiloxane (silicone rubber) at the level of several microns is used as an elastic material of the outermost layer.

Another object of the present invention is to provide a fixing-unit roller having both a good toner releasability and a good scratch/wear resistance and is suited for full-color machines, in which a composite material obtained by dispersing a fluoroelastomer uniformly in an organopolysiloxane at the level of several microns, in the fluoroelastomer a fluorine resin having been dispersed, is used as an elastic material of the outermost layer.

Still another object of the present invention is to provide a process for producing such a fixing-unit roller, and provide a fixing assembly making use of such a fixing-unit roller.

To achieve the above objects, the present invention provides a fixing-unit roller comprising at least one of a fixing roller and a pressure roller which comprise(s) a cylindrical shaft member and formed on the periphery thereof an elastic material layer having a single-layer or multi-layer structure, and at least the outermost layer of the elastic material layer comprises a composite material of an organopolysiloxane and a fluoroelastomer;

the composite material having an island-in-sea structure wherein the organopolysiloxane stands as a sea phase and the fluoroelastomer as an island phase, and particles of the island phase have a size ranging from 1 μm to 10 μm.

In the present invention, the "fixing-unit roller" refers to a fixing roller or a pressure roller, or a fixing roller and a pressure roller.

In the fixing-unit roller of the present invention, a fluorine resin may be dispersed in the island phase fluoroelastomer, and the fluorine resin may be present only in the island phase fluoroelastomer.

In the fixing-unit roller of the present invention, the fluoroelastomer, (B), and the fluorine resin, (C), may be mixed in a proportion of from 100:0 to 40:60 in weight ratio of (B)/(C), and the organopolysiloxane, (A), and the fluoroelastomer (B) may be mixed in a proportion of from 80:20 to 20:80 in weight ratio of (A)/(B).

The present invention also provides a process for producing a fixing-unit roller, the process comprising the step of preparing a composite material to be used in the fixing-unit roller, by kneading an organopolysiloxane and a fluoroelastomer or kneading an organopolysiloxane and a fluoroelastomer in which a fluorine resin has been dispersed.

In the fixing-unit roller production process of the present invention, as the organopolysiloxane a liquid organopolysiloxane having a viscosity of from 100 Pa·s to 1,000 Pa·s at 25° C. and as the fluoroelastomer a fluoroelastomer having a Mooney viscosity of 70-ML1+10(100° C.) or below may be kneaded under application of heat of from 160° C. to 220° C.

In the fixing-unit roller production process of the present invention, the organopolysiloxane and the fluoroelastomer may both comprise a material species vulcanizable with an organic peroxide.

In the fixing-unit roller production process of the present invention, the organopolysiloxane and the fluoroelastomer, or the organopolysiloxane and the fluoroelastomer in which a fluorine resin has been dispersed, may be kneaded under application of heat, thereafter at least a vulcanizing agent may be mixed at a temperature lower than the vulcanizing temperature, and the mixture obtained may be so applied as to form at least an outermost layer of an elastic material layer formed on the periphery of a cylindrical shaft member, followed by heating at a temperature not lower than the vulcanizing temperature to cause to cure the mixture thus applied.

The present invention still also provides a fixing assembly usable in an electrophotographic image-forming apparatus, comprising the fixing-unit roller described above.

DETAILED DESCRIPTION OF THE PREFERRED EMBODIMENTS

Figure 1:
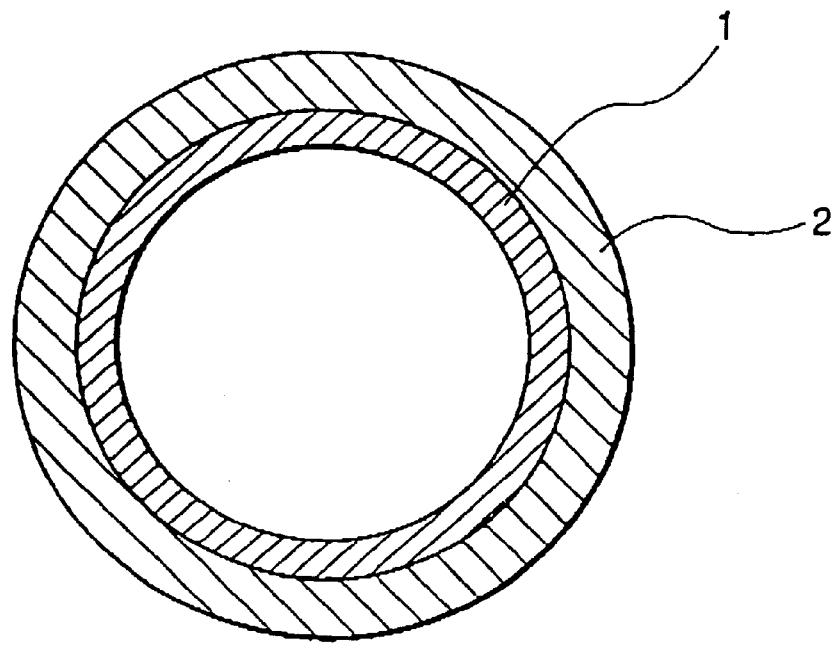
FIG. 1 is a cross-sectional view of a fixing-unit roller having a single-layer structure according to the present invention.

The fixing-unit roller of the present invention comprises a fixing roller and/or a pressure roller which comprise(s) a cylindrical shaft member and formed on the periphery thereof an elastic material layer having a single-layer or multi-layer structure. At least the outermost layer of the elastic material layer has a composite material of an organopolysiloxane and a fluoroelastomer. The composite material has an island-in-sea structure wherein the organopolysiloxane stands as a sea phase and the fluoroelastomer as an island phase, and particles of the island phase have a size ranging from 1 $\mu$m to 10 $\mu$m.

In the present invention, the outermost layer of the fixing-unit roller is formed of a composite material having an island-in-sea structure wherein the sea phase is comprised of an organopolysiloxane, having a relatively high hardness, and the island phase is comprised of a fluoroelastomer, having a relatively low hardness. Thus, it is considered that any stress applied to the roller's outermost layer, caused by the matter adhering to the member set in contact with the roller, can be scattered in the sea phase so as to be relaxed, and also an elastic force acting against the stress can be obtained in the island phase to make the roller itself hardly deformable, and hence the roller can exhibit good scratch resistance and wear resistance. Also, the organopolysiloxane stands as the sea phase, and particles of the island phase comprised of a fluoroelastomer have a size ranging from 1 $\mu$m to 10 $\mu$m. Thus, it is considered that the roller can have a good toner releasability.

In the composite material constituting the outermost layer and having the island-in-sea structure wherein the organopolysiloxane stands as the sea phase and the fluoroelastomer as the island phase, a fluorine resin commonly having a lower surface energy than the fluoroelastomer and organopolysiloxane may be present only in the island phase fluoroelastomer. This enables efficient control of the relatively high surface energy of the island phase fluoroelastomer, and a more satisfactory toner releasability than in a case where these three materials are merely dispersed can be achieved even when the fluorine resin is mixed in a small proportion. Hence, the composite material can also well function as a soft material having a flexibility high enough to obtain a high image quality. Thus, a fixing-unit roller suited for full-color machines can be provided.

In the present invention, the organopolysiloxane may be mixed in an amount of at least 20% and the fluoroelastomer at least 20%. Thus, the organopolysiloxane, having a lower surface energy than the fluoroelastomer, can readily be made to stand as the sea phase, and the fluoroelastomer as the island phase. Also, the fluorine resin may be mixed in a proportion of 60 at maximum with respect to 40 for the fluoroelastomer. Thus, the fixing-unit roller can have a flexibility necessary for the toner releasability and high image quality.

In the process for producing the fixing-unit roller of the present invention, the composite material to be used to form the outermost layer of the fixing-unit roller is prepared by kneading an organopolysiloxane and a fluoroelastomer or kneading an organopolysiloxane and a fluoroelastomer in which a fluorine resin has been dispersed.

In the fixing-unit roller production process of the present invention, when the composite material is prepared, both the organopolysiloxane and the fluoroelastomer which may contain the fluorine resin may be heated so that they can each have a viscosity lower than that at room temperature and the both can have a small difference in viscosity. This enables improvement in dispersibility of the respective materials at the time of kneading, and enables preparation of the composite material having the island-in-sea structure in which the lower-viscosity organopolysiloxane stands as the sea phase and the higher-viscosity fluoroelastomer as the island phase and particles of the island phase have a size ranging from 1 $\mu$m to 10 $\mu$m.

In the above process of the present invention, in the case when the organopolysiloxane and the fluoroelastomer which may contain the fluorine resin are heated, the heating condition may be set at a temperature of from 160° C. to 220° C. Thus, even with use of a liquid organopolysiloxane, a composite material can be obtained in which the fluoroelastomer which may contain the fluorine resin has been dispersed uniformly in the liquid organopolysiloxane at the level of several microns.

In the above process of the present invention, the organopolysiloxane and the fluoroelastomer may both be materials vulcanizable with an organic peroxide. A peroxide reaction system may be selected as a system for vulcanizing the organopolysiloxane, and a peroxide vulcanization system as a system for vulcanizing the fluoroelastomer. This can unify the cross-linking reaction for the organopolysiloxane and that for the fluoroelastomer to radical reaction.

In the above process of the present invention, after the organopolysiloxane and the fluoroelastomer, or the organopolysiloxane and the fluoroelastomer in which a fluorine resin has been dispersed, are kneaded under application of heat, at least a vulcanizing agent may be mixed at a temperature lower than the vulcanizing temperature, and the mixture obtained may be so applied as to form at least the outermost layer of an elastic material layer formed on the periphery of the cylindrical shaft member, followed by heating at a temperature not lower than the vulcanizing temperature to cause to cure the mixture thus applied. This makes it easy to produce a fixing-unit roller having good scratch resistance and wear resistance and superior toner releasability.

The fixing assembly of the present Invention has the fixing-unit roller described above. Thus, a fixing assembly usable in electrophotographic image-forming apparatus can be provided, which has both superior toner releasability and superior scratch/wear resistance and can obtain fixed images with a high image quality.

The present invention will be described below in detail.

In the present invention, the "size" of the particles of the island phase refers to an average value of length diameters and breadth diameters of particles each maximum diameter part of which is fixed as the major-axis direction and the minor axis of which is set anew so as to be equal in area for each particle to regard the particle shape as an ellipse.

In the composite material used in the present invention, the organopolysiloxane (silicone rubber) may include, as its polymer species, dimethylsiloxane, methylvinylsiloxane, methylphenylsiloxane and methylfluoroalkylsiloxanes. These may chiefly be straight-chain polymers, but a branched or three-dimensional structure may partly be formed. These may also be homopolymers, copolymers or a mixture of these.

The molecular chain terminals of the organopolysiloxane may be substituted with, e.g., alkoxyl groups, trimethylsilyl groups, dimethylvinylsilyl groups, methylphenylvinylsilyl groups or methyldiphenylsilyl groups. In particular, dimethylvinylsilyl groups are preferred.

This organopolysiloxane may have a degree of polymerization of from 400 to 10,000, preferably from 1,000 to 9,000. Those of less than 400 in degree of polymerization can not provide good mechanical strength, and those of more than 10,000 are available with difficulty. These organopolysiloxanes may have a material form including a millable type or a liquid form. Either of such organopolysiloxanes may be used.

As the liquid organopolysiloxane, those having a viscosity of from 100 Pa·s to 1,000 Pa·s at 25° C. may preferably be used. Liquid organopolysiloxanes having a viscosity lower than 100 Pa·s have too low a viscosity to obtain any uniform state of dispersion in some cases when heat-kneaded together with the fluoroelastomer.

Then, the fluoroelastomer used in the present invention may include, as its polymer species, e.g., vinylidene fluoride type fluoroelastomers, vinylidene fluoride-hexafluoropropylene copolymer, vinylidene fluoride-hexafluoropropylene-tetrafluoroethylene terpolymer, tetrafluoroethylene-propylene type fluoroelastomers, fluorine-containing vinyl ether type fluoroelastomers, tetrafluoroethylene-perfluoro(alkyl vinyl ether) copolymers, and fluorine-containing phosphazene rubbers. Vinylidene fluoride-hexafluoropropylene-tetrafluoroethylene terpolymer and vinylidene fluoride-hexafluoropropylene copolymer may preferably be used. Peroxide-vulcanized fluoroelastomers which may also be used in the present invention are of the type a halogen, in particular, iodine and/or bromine has been introduced into the molecular chain terminal and/or the side chain. Vulcanization is effected by halogen atom abstraction reaction.

The fluoroelastomer used in the present invention may preferably have a Mooney viscosity of 70-ML1+10(100° C.) or below. More specifically, if it has a Mooney viscosity higher than that, any uniform state of dispersion can not be achieved in some cases when heat-kneaded together with the organopolysiloxane.

The organopolysiloxane, (A), and the fluoroelastomer, (B), may preferably be mixed in a proportion of from (A):(B)=80:20 to 20:80 in weight ratio. More specifically, the organopolysiloxane may be mixed in an amount of at least 20% and the fluoroelastomer at least 20%. Thus, the organopolysiloxane, having a lower surface energy than the fluoroelastomer, can be made to stand as the island phase, and the fluoroelastomer as the sea phase. Also, in the case when the fluorine resin, (C), is incorporated into the fluoroelastomer (B), these may preferably be mixed in a proportion of from 99:1 to 40:60 in weight ratio of (B)/(C). In order to attain a flexibility necessary for high image quality, the fluorine resin may preferably be mixed in an amount as small as possible, where the weight ratio of (B)/(C) may particularly preferably be set not more than 70:30. Also, in order for the organopolysiloxane, having a lower surface energy than the fluoroelastomer, to stand as the sea phase, the organopolysiloxane must be mixed in an amount of at least 20% and the fluoroelastomer at least 20%, and, in order to improve durability or wear resistance, the fluoroelastomer must be mixed in an amount of at least 20%. Namely, it is preferable for the above three components to be mixed in such a proportion that their own inherent properties can well be brought out.

As methods for preparing the composite material, a method may be employed in which the organopolysiloxane and the fluoroelastomer, or the organopolysiloxane and the fluoroelastomer in which a fluorine resin has been dispersed, are kneaded under application of heat. Here, these may preferably be heated at a temperature of from 100° C. to 250° C., and may preferably be kneaded for a time of from 2 minutes to 1 hour. As a kneading machine, extruders, mixers, Banbury mixers, kneaders and roll mills of various types may be used, but not limited to these only.

Here, if the organopolysiloxane and fluoroelastomer are kneaded at a temperature higher than 250° C., they may undergo thermal deterioration. Also, kneading them for a time shorter than two minutes may make it difficult to obtain the composite material in a uniformly dispersed state. On the other hand, kneading them for a time longer than 1 hour may result in a cost increase undesirably.

Especially when a liquid organopolysiloxane having a viscosity of from 100 Pa·s to 1,000 Pa·s at 25° C. and a fluoroelastomer having a Mooney viscosity of 70-ML1+10 (100° C.) or below are kneaded, they must be heated at a temperature of from 160° C. to 220° C., and may preferably be kneaded by a method making use of an internal mixer such as a mixer, a Banbury mixer or a kneader from the viewpoint of operability.

In the above composite material, in addition to the organopolysiloxane and the fluoroelastomer, a vulcanizing agent and a vulcanizing auxiliary agent (or accelerator) may be contained, and a reinforcing compounding additive such as carbon black or silica may also be mixed.

As a method other than the foregoing for preparing the composite material, particles obtained by chipping or finely dividing a fluoroelastomer having been vulcanized and an unvulcanized organopolysiloxane may be kneaded.

The vulcanization system for the organopolysiloxane used in the present invention includes a condensation reaction system, an addition reaction system and a peroxide reaction system. Also, the vulcanization system for the fluoroelastomer includes a polyol vulcanization system, a polyamine vulcanization system and a peroxide vulcanization system.

In the present invention, the organopolysiloxane and the fluoroelastomer may both preferably be vulcanized with an organic peroxide. In the case when such a peroxide reaction system is selected as the vulcanization system for the organopolysiloxane and a peroxide vulcanization system as the vulcanization system for the fluoroelastomer, the cross-linking reaction for the organopolysiloxane and that for the fluoroelastomer are both radical reaction, and there is an advantage that the reaction system and vulcanizing agent can be unified.

The organic peroxide which is a vulcanizing agent used here is roughly grouped into four types: diacyl peroxides, peroxyesters, peroxyketals and dialkylperoxides.

The diacyl peroxides may include benzoyl peroxide, 2,4-dichlorobenzoyl peroxide, bis(p-chlorobenzoyl) peroxide and bis(o-methylbenzoyl)peroxide.

The peroxyesters may include t-butylperoxybenzoate, 2,5-diemthyl-2,5-di(benzoylperoxy)hexane and t-butylperoxyisopropyl carbonate.

The peroxyketals may include 1,1-bis(t-butylperoxy)-3,3, 5-trimethylcyclohexane, 1,1-bis(t-butylperoxy) cyclohexane, 2,2-bis(t-butylperoxy)octane and n-butyl-4,4-bis(t-butylperoxy)valerate.

The dialkylperoxides may include di-t-butyl peroxide, t-butylcumyl peroxide, dicumyl peroxide, α,α-bis(t- butylperoxy-m-isopropyl)benzene, 2,5-dimethyl-2,5-di(t-butylperoxy)hexane and 2,5-dimethyl-2,5-di(t-butylperoxy)hexyne-3.

These organic peroxides are available as industrial pure products, or pasty products prepared using silicone rubber or silicone oil as a binder, or powdery products sprinkled with powder such as calcium carbonate.

There are no particular limitations on the organic peroxide used to vulcanize the organopolysiloxane and fluoroelastomer composite material. It is preferable to use dicumyl peroxide or 2,5-dimethyl-2,5-di(t-butylperoxy)hexane, belonging to the dialkylperoxides.

The organic peroxide may be mixed in an amount of from 0.5 to 10 parts by weight, and preferably from 1 to 5 parts by weight, based on 100 parts by weight of the mixed elastomer components consisting of the component-(A) organopolysiloxane and component-(B) fluoroelastomer. Its mixing in too small an amount may make the cross-linking of the elastomer component insufficient to achieve no sufficient mechanical strength. On the other hand, its mixing in too large an amount may make the elastomer component have a high cross-link density to make the resultant composition (composite material) have a low elongation.

The vulcanizing auxiliary agent may include polyfunctional vinyl monomers such as ethylene dimethacrylate, 1,3-butylene dimethacrylate, 1,4-butylene dimethacrylate, 1,6-hexanediol dimethacrylate, polyethylene glycol dimethacrylate, 1,4-butanediol diacrylate, 1,6-hexanediol diacrylate, 2,2'-bis(4-methacryloyldiethoxyphenyl)propane, trimethylolpropane trimethacrylate, trimethylolpropane triacrylate, pentaerythritol triacrylate, divinylbenzene, N,N'-methylenebisacrylamide, p-quinone dioxime, p,p'-dibenzoylquinone dioxime, triazine dithiol, triallyl cyanurate, triallyl isocyanurate, bismaleimide, and silicone oil containing vinyl groups in a large quantity. In particular, triallyl isocyanurate may preferably be used.

This vulcanizing auxiliary agent may be mixed in an amount of from 0.5 to 10 parts by weight, and preferably from 1 to 5 parts by weight, based on 100 parts by weight of the organopolysiloxane and fluoroelastomer composite material.

When the vulcanizing auxiliary agent and the vulcanizing agent organic peroxide are added, the kneading temperature must be a temperature at which any vulcanization reaction does not take place, and may preferably be from 10° C. to 80° C., and more preferably from 20° C. to 60° C.

In the case when a polyol vulcanization system is used to vulcanize the component-(B) fluoroelastomer, the vulcanizing agent and vulcanizing auxiliary agent as described above can not be used in the component (B). Accordingly, the vulcanizing agent used to vulcanize the component-(A) organopolysiloxane and a vulcanizing agent and a vulcanizing auxiliary agent which are used to vulcanize the component (B) must be added.

Here, usable as the polyol vulcanizing agent are polyhydroxyaromatic compounds as exemplified by hydroquinone, bisphenol A, bisphenol AF, and salts or fluorine-containing aliphatic diols of these.

Any of these polyol vulcanizing agent may be added in an amount of from about 0.1 to 20 parts by weight, and preferably from about 1 to 10 parts by weight, based on 100 parts by weight of the component (B).

The polyol vulcanizing auxiliary agent may include quaternary ammonium compounds such as benzyltriethylammonium chloride, methyltrioctylammonium chloride and tetrahexylammonium tetrafluoroborate; and quaternary phosphonium compounds such as benzyltrioctylphosphonium bromide, benzyltriphenylphosphonium chloride and m-trifluoromethyl benzyltrioctylphosphonium chloride.

Such a polyol vulcanizing auxiliary agent may usually be added in an amount of from about 0.2 to 10 parts by weight based on 100 parts by weight of the component (B).

The composite material used in the elastic-material outermost layer of the fixing-unit roller of the present invention may contain, in addition to the chief components (A) and (B) organopolysiloxane and fluoroelastomer, various compounding additives such as a reinforcing filler, an aging preventive agent and a heat-resisting agent.

Such compounding additives may be added at any time or at any stage as long as they are added before the components (A) and (B) composite material is vulcanized. Preferably, they may be added at a stage after the components (A) and (B) have been heat-kneaded.

The reinforcing filler may include, e.g., silica, carbon black, and quartz powder.

The aging preventive agent may include, e.g., quinolines, phosphates, phenylenediamines, cresols, phenols and dithiocarbamate metal salts; and the heat-resisting agent, e.g., cerium oxide, iron oxide, iron naphthenate, potassium hydroxide and potassium naphthenate; any of which may be mixed. Besides these, a colorant, a ultraviolet-light absorber, a foaming agent and so forth may optionally be mixed as desired.

The fixing-unit roller of the present invention may be produced, e.g., in the following way. First, the organopolysiloxane and the fluoroelastomer in which the fluorine resin may previously be dispersed are kneaded under application of heat as described previously, to make the fluoroelastomer disperse uniformly as particles having a size of from 1 to 10 $\mu$m. Thereafter, the vulcanizing agent and the vulcanizing auxiliary agent are added and mixed at a temperature lower than vulcanization temperature as described previously. The mixture obtained (the composite material) is press-molded by transfer molding making use of a mold, in such a way that it can be at least the outermost layer of the elastic material layer formed on the periphery of a cylindrical shaft member (a mandrel) on which a primer has been coated uniformly and dried. Then the steps of mold vulcanization, demolding, secondary vulcanization and polishing are carried out to produce the fixing-unit roller. Also, in the case when the liquid organopolysiloxane is used, as described previously the liquid organopolysiloxane having a viscosity ranging from 100 Pa·s to 1,000 Pa·s at 25° C. and the fluoroelastomer having a Mooney viscosity of 70-ML1+10(100° C.) or below are kneaded under application of heat at 160° C. to 220° C., and thereafter the vulcanizing agent and the vulcanizing auxiliary agent are mixed at the temperature at which any vulcanization reaction does not take place, thus the composite material dispersed at the level of microns is prepared which is used in the elastic material layer of the roller. Next, a cylindrical shaft member (a roller mandrel or a roller on which a heat-resistant elastic material layer has been formed) on which a primer has been coated uniformly and dried is prepared, and the composite material is press-molded by transfer molding making use of a mold in the same manner as the above, followed by the steps of demolding, secondary vulcanization and polishing to produce the fixing-unit roller.

Figure 2:
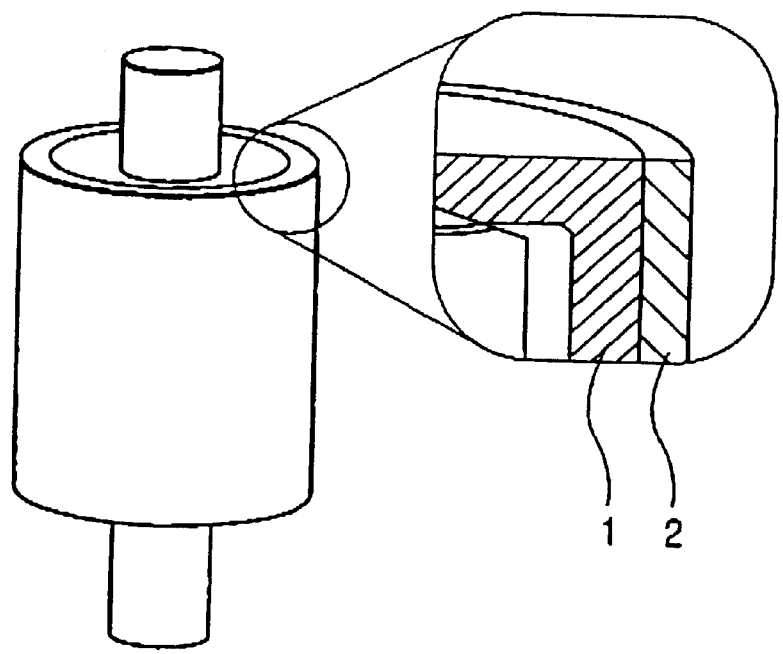
FIG. 2 is a perspective view of the fixing-unit roller having a single-layer structure according to the present invention, and a partial enlarged cross-sectional view thereof.
Figure 3:
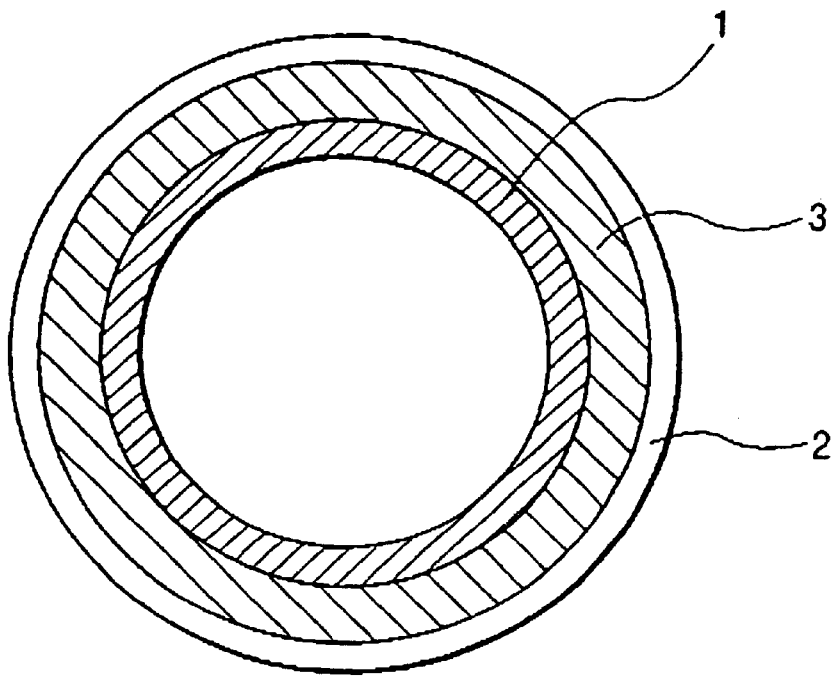
FIG. 3 is a cross-sectional view of a fixing-unit roller having a double-layer structure according to the present invention.

A roller having a single-layer structure, obtained in this way is shown in FIGS. 1 and 2. In FIGS. 1 and 2, reference numeral 1 denotes a roller mandrel; and 2, an elastic material layer (outermost layer) formed of the composite material comprised of the organopolysiloxane and the fluoroelastomer which may also contain the fluorine resin. Also, a roller having a double-layer structure is shown in FIG. 3. The roller having a double-layer structure comprises a roller mandrel 1, and provided on the periphery thereof firstly a heat-resistant elastic material layer 3 formed of a conventional silicone rubber and then on the periphery of this elastic material layer 3 an elastic material layer 2 (outermost layer) formed of the composite material of the present invention. Incidentally, the fixing-unit roller of the present invention is by no means limited to the above roller having a single- or double-layer structure, and may have a triple- or more-layer structure.

The fixing-unit roller of the present Invention can of course be used as the fixing roller and the pressure roller which are fixing-unit members of electrophotographic image-forming apparatus, and also can be applied in uses other than these, such as oil feed rollers and oil regulation blades.

EXAMPLES

The present invention will be described below in greater detail by giving Examples. The present invention is by no means limited by these.

Example 1

A liquid organopolysiloxane comprising (i) 40 parts by weight of straight dimethylpolysiloxane in which the both terminal groups dimethylvinylsiloxane group are blocked and having a viscosity of 10,000 Pa·s at 25° C. and (ii) 60 parts by weight of block polymer comprising straight polysiloxane segment with about 300 bifunctional dimethylsiloxane units and branched polymethylsiloxane segments having one vinyl group bonded to the both terminals of straight polysiloxane segment and having a viscosity of 30 Pa·s at 25° C.; and having a viscosity of 700 Pa·s at 25° C. as a whole and a fluoroelastomer containing iodine as a reactive group and having a Mooney viscosity of 60-ML1+10(1000° C.) (trade name: G902; available from Daikin Industries, Ltd.) were each used in an equal quantity (150 g) and were kneaded by means of a mixer (an all-purpose mixing stirrer Model 5DMV-01-r, manufactured by Daruton K.K.) while heating them to 200° C. Thereafter, 6 g of a vulcanizing auxiliary agent triallyl isocyanurate and 4.5 g of a vulcanizing agent 2,5-dimethyl-2,5 -di(t-butylperoxy) hexane were added, and the materials were again kneaded in the same manner as the above. The composite material thus prepared was press-molded at 170° C. for 15 minutes to produce a rubber sheet of 1 mm thick, followed by secondary vulcanization (180° C., 24 hours) in a heating oven.

The sheet thus obtained was observed with a low-pressure scanning electron microscope (LV-SEM) to examine the state of dispersion at the surface by elementary mapping with an electron-ray probe microanalizer (EPMA) (SEM: JSM-5800 LV Model, manufactured by Nippon Denshi K.K.)(EPMA: DX-Prime Model, manufactured by Nippon Phillips K.K.; is accelerating voltage; 10 kV, measurement mode; low-pressure mode of about 40 Pa; measurement magnification: 1,000: detector: energy dispersion type, EDS; mapping elements: C, F and Si).

Figure 4:
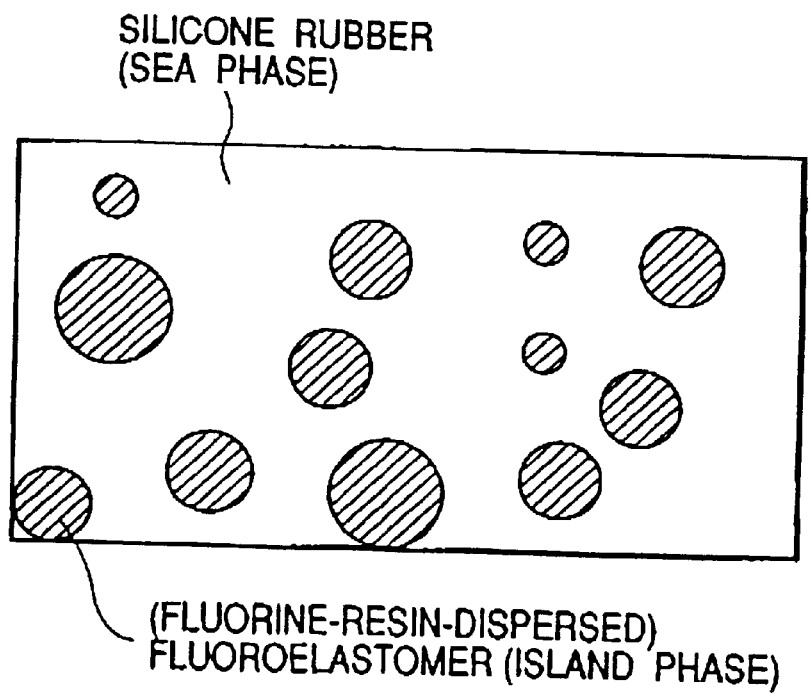
FIG. 4 is a diagrammatic plane view showing the state of dispersion of a composite material used in the fixing-unit roller according to the present invention.

As the result, as shown in FIG. 4, illustrating the state of dispersion, it was found that the sea phase was formed of the organopolysiloxane, and the island phase the fluoroelastomer, and that the particles of the island phase were within the range of 1 to 10 μm in size. Incidentally, this state of dispersion was likewise attained also when kneading means other than the mixer were used.

Comparative Example 1

A liquid organopolysiloxane containing a vinyl group as a reactive group and having a viscosity of 700 Pas·s and a fluoroelastomer containing iodine as a reactive group and having a Mooney viscosity of 60-ML1+10(100° C.) were each used in an equal quantity (150 g) and were kneaded at room temperature by means of an open roll mill (a twin-roll mill manufactured by Kansai Roll K.K.) having a larger shearing force than the mixer. Thereafter, 6 g of a vulcanizing auxiliary agent triallyl isocyanurate and 4.5 g of a vulcanizing agent 2,5-dimethyl-2,5-di(t-butylperoxy)hexane were added, and the materials were again kneaded at room temperature by means of the open roll mill. The composite material thus prepared was press-molded at 170° C. for 15 minutes to produce a rubber sheet of 1 mm thick, followed by secondary vulcanization (180° C., 24 hours) in a heating oven.

The state of dispersion at the surface of the sheet thus obtained was examined in the same manner as in Example 1.

As the result, it was found that the sea phase was formed of the organopolysiloxane, and the island phase the fluoroelastomer, and that the particles of the island phase were of about 50 to 200 μm in size.

Example 2

Using a roller mandrel (external diameter: 58.9 mm; internal diameter: 34 mm) on which a primer (MONICAS V-16A/B, trade name; available from Yokohama Koubunshi K.K.) had uniformly been coated followed by drying, and using a composite material prepared in the same manner as in Example 1, the composite material was press-molded by transfer molding making use of a mold, followed by demolding, secondary vulcanization in a heating oven, and then polishing to finish a roller (external diameter: 59.4 mm; rubber layer thickness: 250 μm). This roller was set as a fixing roller in a monochromatic electrophotographic copying machine to make a copying running test.

Construction of Fixing Assembly

Figure 5:
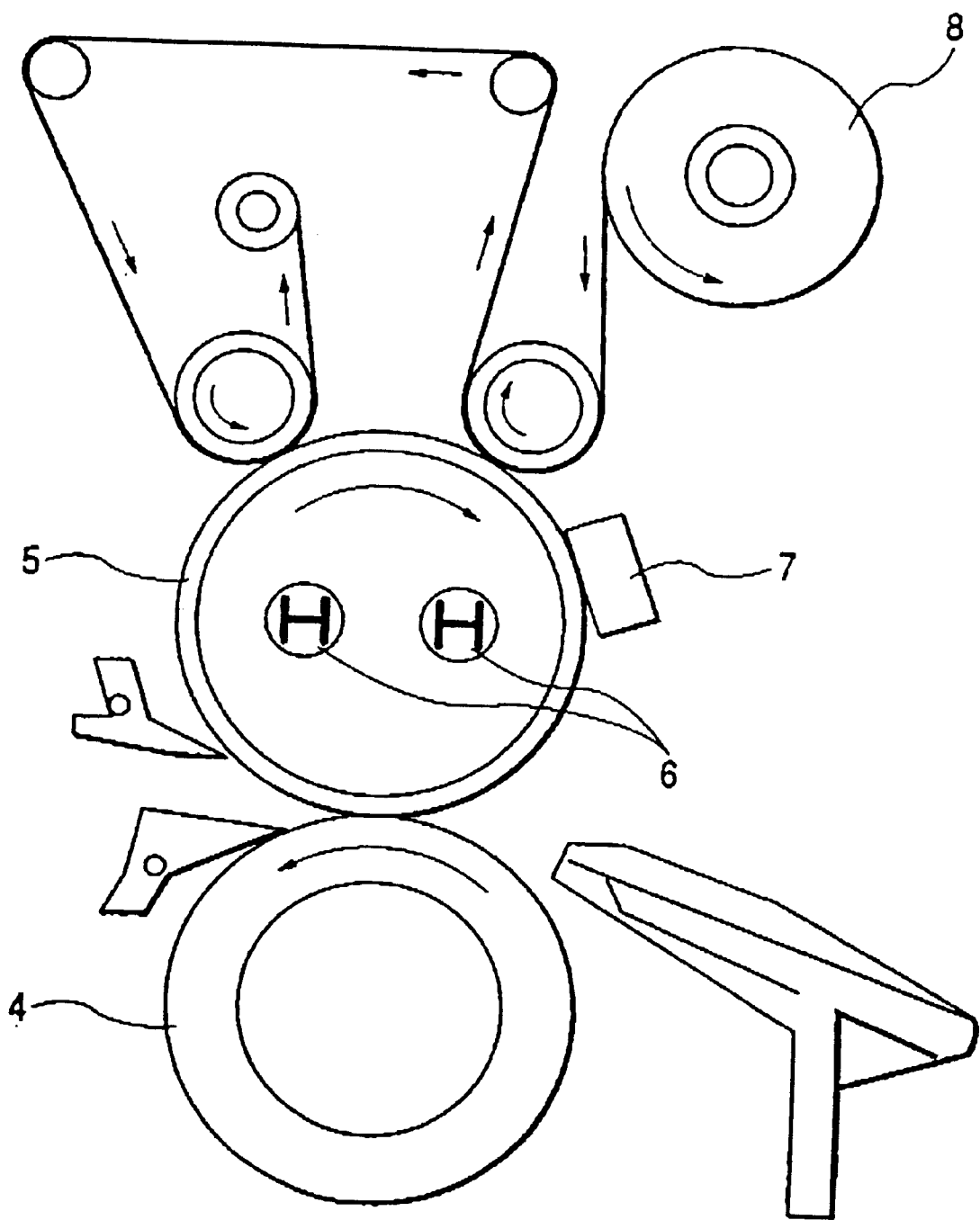
FIG. 5 illustrates the construction of a fixing assembly used in a monochromatic copying machine in order to inspect the effect of the present invention.

FIG. 5 illustrates the construction of a fixing assembly used to inspect the effect of the present invention. The fixing assembly is provided with an upper roller fixing roller 5 and a lower roller pressure roller 4. Two heaters 6 consisting of halogen lamps are set at the center of the fixing roller 4. Fixing temperature is kept at a preset temperature by controlling the output of the heaters 6 in accordance with temperatures detected by measuring with a thermistor 7 the surface temperature of the fixing roller 5. In order to prevent toner offset, a web 8 impregnated with silicone oil is brought into two-point contact with the fixing roller 5 to apply the silicone oil to the fixing roller 4 and to clean its surface by removing the offset toner. Here, the roller produced in the manner as described above is set in as the fixing roller 4 to make the copying running test.

Comparative Example 2

A roller was finished in the same manner as in Example 2 except that the composite material was prepared in the same manner as in Comparative Example 1. The copying running test was made in the same way.

Comparative Example 3

A roller was produced in the same manner as in Example 2 except for using a material prepared by mixing in 300 g of the organopolysiloxane used in Example 1, 6 g of a vulcanizing auxiliary agent triallyl isocyanurate and 4.5 g of a vulcanizing agent 2,5-dimethyl-2,5-di(t-butylperoxy) hexane. The copying running test was made in the same way.

Comparative Example 4

A roller was produced in the same manner as in Example 2 except for using a material prepared by mixing in 300 g of the fluoroelastomer used in Example 1, 6 g of a vulcanizing auxiliary agent triallyl isocyanurate and 4.5 g of a vulcanizing agent 2,5-dimethyl-2,5-di(t-butylperoxy)hexane. The copying running test was made in the same way.

As can be seen from the results of Example 1 and Comparative Example 1, in the kneading of the liquid organopolysiloxane having a viscosity within the range of 100 Pa·s to 1,000 Pa·s at 25° C. and the fluoroelastomer having a Mooney viscosity of 70-ML1+10(100° C.) or below, the kneading carried out under application of heat at 160° C. to 220° C. brings about an improvement in the state of dispersion by an order to two orders compared with the kneading carried out merely mechanically without heating, and a composite material having a uniform state of dispersion at the level of microns can be obtained.

The results of the copying running test made in Example 2 and Comparative Examples 2 to 4 are shown in Table 1.

TABLE 1

| Material (island phase/sea phase) | Toner releasability | Scratch resistance | Overall durability |
|---|---|---|---|
| Example: | | | |
| 2 Fluoroelastomer 1 to 10 μm/organopolysiloxane | OK | OK | OK |
| Comparative Example: | | | |
| 2 Fluoroelastomer 50 to 250 μm/organopolysiloxane | NG | — | NG |
| 3 Organopolysiloxane alone | — | NG | NG |
| 4 Fluoroelastomer alone | NG | — | NG |

OK: 300,000 sheet running cleared.
NG: 300,000 sheet running retired.

What is shown in Table 1 is explained as follows: First, in the case of Example 2, neither blank images nor uneven images caused by toner offset were seen in copied images at the time of running on 100,000 sheets to obtain good copied images. Also, any scratch lines which might be caused by the matter adhering to the web and might have affected copied images were not seen on the roller surface after the running. On the other hand, in the case of Comparative Example 2, blank images caused by toner offset appeared in copied images at the time of running on 50,000 sheets. In the case of Comparative Example 3, many scratch lines were visually seen on the roller surface at the time of running on 20,000 sheets, and the scratch lines appeared on copied images as blank lines. Also, in the case of Comparative Example 4, toner offset occurred at the time of running on 20,000 sheets.

Examples 3 and 4

The fluoroelastomer (B) and the fluorine resin (C) were previously kneaded by means of an open roll mill in the weight ratio shown in Table 2. Next, the resultant mixture of (B) and (C) and the organopolysiloxane (A) were mixed while heating them (at about 200° C.) in an internal mixer. Thereafter, the vulcanizing auxiliary agent and the vulcanizing agent were added in the proportion shown in Table 2, at a temperature (about 50° C.) lower than the vulcanization temperature, and were again kneaded to prepare a rubber composition. Next, this rubber composition was mold-vulcanized together with an aluminum shaft member coated with an adhesive on its periphery, followed by polishing to form an elastic material layer of 250 μm thick. Then, this was subjected to secondary vulcanization to produce a roller having the single-layer structure shown in FIGS. 1 and 2.

TABLE 2

| | Example | |
|---|---|---|
| | 3 | 4 |
| Heat-kneading: | | |
| Organopolysiloxane (A) | 45 | 40 |
| Fluoroelastomer (B)*1 | 45 | 40 |
| Fluorine resin (C)*2 | 10 | 20 |
| Kneading at temperature lower than vulcanization temperature:*3 | | |
| Vulcanizing auxiliary agent*4 | 4 | 4 |
| Vulcanizing agent*5 | 1.5 | 1.5 |

*1: G902 (trade name; peroxide-vulcanized), available from Daikin Industries, Ltd.
*2: LUBRON L5F (trade name; PTFE), available from Daikin Industries, Ltd.
*3: Mixed in amount based on 100 parts by weight of the total of (A) and (B).
*4: "TAIC" (triallyl isocyanurate) available from Nippon Kasei K.K.
*5: PERHEXA 25B (trade name; 2,5-dimethyl-2,5-di(t-butylperoxy) hexane), available from Nippon Oil and Fats Co., Ltd.

The rollers obtained were each set as a fixing roller in an electrophotographic copying machine to make a copying running test. As the result, both the rollers of Examples 3 and 4 did not cause anything wrong at all even over running on 100,000 sheets.

What is claimed is:

1. A fixing-unit roller comprising at least one of a fixing roller and a pressure roller which comprise(s) a cylindrical shaft member and formed on the periphery thereof an elastic material layer having a single-layer or multi-layer structure, and at least the outermost layer of the elastic material layer comprises a composite material of an organopolysiloxane and a fluoroelastomer;

said composite material having an island-in-sea structure wherein said organopolysiloxane stands as a sea phase and said fluoroelastomer as an island phase, and particles of the island phase have a size ranging from 1 μm to 10 μm.

2. The fixing-unit roller according to claim 1, wherein a fluorine resin is dispersed in said island phase fluoroelastomer, and the fluorine resin is present only in said island phase fluoroelastomer.

3. The fixing-unit roller according to claim 1 or 2, wherein said fluoroelastomer, (B), and said fluorine resin, (C), are mixed in a proportion of from 100:0 to 40:60 in weight ratio of (B)/(C), and the organopolysiloxane, (A), and the fluoroelastomer (B) are mixed in a proportion of from 80:20 to 20:80 in weight ratio of (A)/(B).

4. A fixing assembly usable in an electrophotographic image-forming apparatus, comprising the fixing-unit roller according to claim 3.

5. A process for producing the fixing-unit roller of claim 1 or 2, the process comprising the step of;

preparing a composite material to be used in the fixing-unit roller, by kneading under application of heat i) an organopolysiloxane and a fluoroelastomer or ii) an organopolysiloxane and a fluoroelastomer in which a fluorine resin has been dispersed.

6. The process for producing a fixing-unit roller according to claim 5, wherein as said organopolysiloxane a liquid organopolysiloxane having a viscosity of from 100 Pa·s to 1,000 Pa·s at 25° C. and as said fluoroelastomer a fluoroelastomer having a Mooney viscosity of 70-ML1+10(100° C.) or below are kneaded under application of heat of from 160° C. to 220° C.

7. The process for producing a fixing-unit roller according to claim 6, wherein said organopolysiloxane and said fluoroelastomer both comprise a material species vulcanizable with an organic peroxide.

8. The process for producing a fixing-unit roller according to claim 5, wherein said organopolysiloxane and said fluoroelastomer both comprise a material species vulcanizable with an organic peroxide.

9. The process for producing a fixing-unit roller according to claim 5, wherein said organopolysiloxane and said fluoroelastomer, or said organopolysiloxane and said fluoroelastomer in which a fluorine resin has been dispersed, are kneaded under application of heat, thereafter at least a vulcanizing agent is mixed at a temperature lower than the vulcanizing temperature, and the mixture obtained is so applied as to form at least an outermost layer of an elastic material layer formed on the periphery of a cylindrical shaft member, followed by heating at a temperature not lower than the vulcanizing temperature to cause to cure the mixture thus applied.

10. A fixing assembly usable in an electrophotographic image-forming apparatus, comprising the fixing-unit roller according to claim 1 or 2.

* * * * *

UNITED STATES PATENT AND TRADEMARK OFFICE
CERTIFICATE OF CORRECTION

PATENT NO. : 6,321,062 B1
DATED : November 20, 2001
INVENTOR(S) : Yuji Kitano et al.

It is certified that error appears in the above-identified patent and that said Letters Patent is hereby corrected as shown below:

Column 1,
Line 67, "gathers" should read -- gather --.

Column 3,
Lines 40 and 44, "a" should read -- an --.
Line 51, "is" should be deleted.

Column 9,
Line 61, "agent" should read -- agents --.

Column 10,
Line 26, "a" ($2^{nd}$ occurrence) should read -- an --.

Column 11,
Line 40, "10(1000°C.)" should read -- 10(100°C.) --.
Line 46, "2,5-dimethyl-2,5 –di(t-butylperoxy)" should read -- 2,5-dimethyl-2,5-di(t-butylperoxy) --.
Line 58, "is accelerating voltage; 10kV," should read -- accelerating voltage: 10kV; --.
Line 59, "mode;" should read -- mode: --.
Line 60, "1,000:" should read -- 1,000; --.

Column 12,
Line 6, "700 Pas.s" should read -- 700 Pa.s --.
Lines 54 and 56, "roller 4" should read -- roller 5 --.

Signed and Sealed this

Twenty-fifth Day of June, 2002

Attest:

*Attesting Officer*

JAMES E. ROGAN
*Director of the United States Patent and Trademark Office*